June 6, 1961

V. K. ELORANTA 2,986,986

CAMERA SHUTTER

Filed April 3, 1957

INVENTOR.
Vaito K. Eloranta
BY
*Brown and Mikulka*
and
*Robert E. Corb*
ATTORNEYS

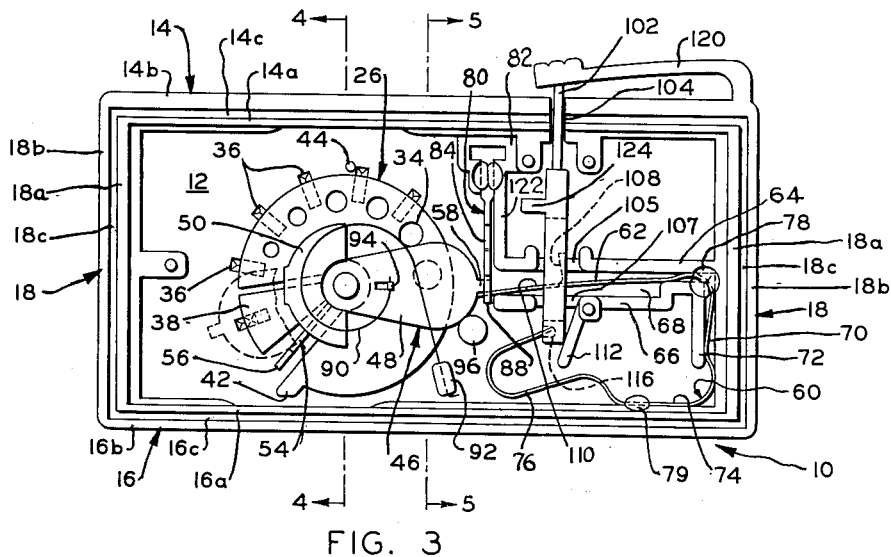

United States Patent Office 2,986,986
Patented June 6, 1961

2,986,986
CAMERA SHUTTER
Vaito K. Eloranta, Needham, Mass., assignor to Polaroid Corporation, Cambridge, Mass., a corporation of Delaware
Filed Apr. 3, 1957, Ser. No. 650,415
20 Claims. (Cl. 95—64)

This invention relates to photographic apparatus and, more particularly, to a novel shutter device for cameras.

In the copending application of Edwin H. Land and Vaito K. Eloranta, Serial No. 645,526, filed March 12, 1957, there is disclosed a photographic product in the form of a novel camera containing a plurality of photographic film units and adapted to be employed for exposing and processing the film units to produce a plurality of photographic prints. The construction of the camera itself is quite simple and inexpensive so that it may be readily discarded after it has been employed for exposing and processing the film units with which it is provided.

The present invention is concerned with the provision of a shutter for such a camera and has, as an object, the provision of a shutter having a simple and inexpensive construction which is easy to fabricate and assemble.

Other objects of the invention are: to provide an inexpensive shutter capable of being set by a single control to operate at a plurality of accurately determined speeds and apertures; and to provide a multispeed and aperture shutter comprised, for the most part, of molded plastic materials, with a minimum of other elements formed of metal.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a view similar to FIG. 2 with the elements of the shutter mechanism shown in their position just prior to release;

FIG. 4 is a sectional view taken along the line 4—4 of FIG. 3;

FIG. 5 is a sectional view taken along the line 5—5 of FIG. 3; and

FIG. 6 is a fragmentary perspective view of components of the shutter mechanism.

Figure 1:
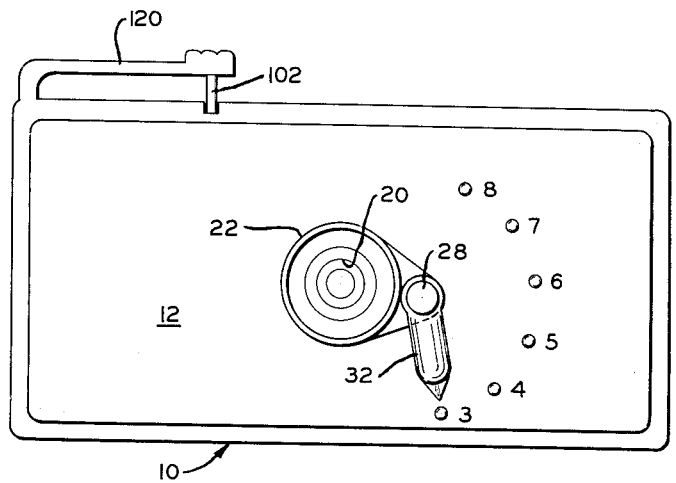
FIGURE 1 is a front elevational view of the shutter embodying the invention.

The shutter of the invention is intended to provide a plurality of accurately predetermined exposure speeds and apertures with a structure which is characterized by its simplicity and inexpensiveness. The design and construction of the shutter are such as to readily permit its fabrication, primarily from molded plastic materials, with only a minimum of metallic elements, yet still maintain dependable and accurate operation. Generally, the shutter is of the type including a shutter blade to which is imparted an aperture-uncovering motion and means midway in the path of travel of the blade for reversing its direction of motion so that the blade returns to aperture-covering position. The shutter may be set for a plurality of correlated apertures and speeds with a single control element. The construction of the shutter is intended to be sufficiently inexpensive so that it may be provided as an element of a photographic product, specifically a camera, adapted to be discarded following empolyment to produce a limited number of photographic prints from materials initially provided in the camera.

In the form shown in the drawings, the shutter comprises a chassis or housing member designated 10, providing a support for all of the elements of the shutter mechanism. Chassis 10 is preferably formed of an opaque, organic plastic material such as polystyrene and cellulose acetate butyrate by conventional molding methods and is designed to readily lend itself to this type of fabrication. The housing member includes a forward wall 12, upper side wall 14, lower side wall 16 and end walls 18. Walls 14, 16, and 18 include, respectively, rearwardly projecting inner lips or flanges 14a, 16a and 18a and shorter outer lips or flanges 14b, 16b and 18b cooperating with the inner lips to provide peripheral grooves 14c, 16c and 18c, adapted to seat portions of the walls of apparatus with which the shutter is associated and form a lighttight coupling therewith. An aperture 20 is provided in forward wall 12 along with a cylindrical lip 22 surrounding aperture 20 and adapted to mount a photographic objective lens 24.

As a means for providing a plurality of different apertures, the shutter includes a diaphragm disk 26, also adapted to be formed of molded plastic material. Disk 26 is mounted for pivotal movement about its center on a stud or shaft 28, preferably molded integrally with the disk and journaled in a hole 30 in forward wall 12 adjacent aperture 20. A lever 32, formed of plastic material, is secured to the end of shaft 28 exterior of wall 12 whereby the disk may be rotated manually for selecting specific aperture and speed settings.

Figure 2:
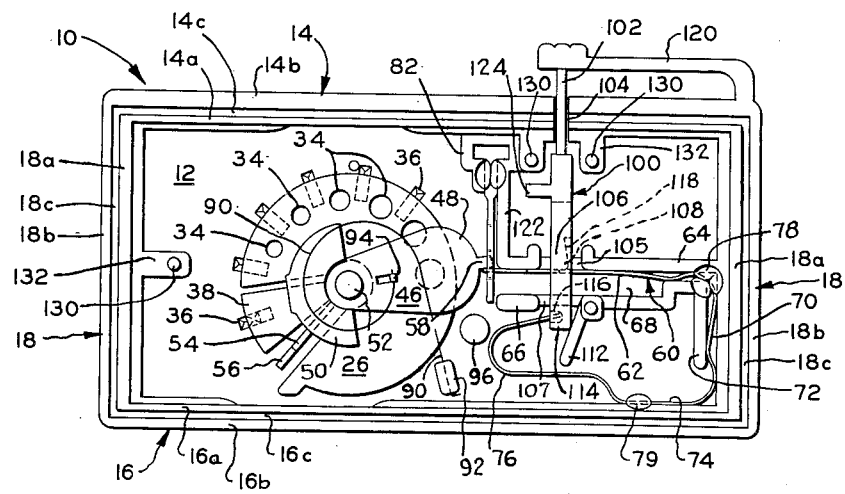
FIG. 2 is a rear elevational view of the shutter of FIG. 1, shown with the rear wall removed and the elements of the shutter mechanism at a position of rest.

The shutter, in the form shown, may be adjusted for any of six correlated aperture and speed settings and, accordingly, disk 26 is provided with six apertures 34 located so that each can be rotated into alignment with aperture 20 and the optical axis of lens 24. Indexing means are provided for locating the disk at each of the various positions wherein one of apertures 34 is located in alignment with aperture 20 and this means comprises a series of six spaced recesses 36 in the inner or rear surface of forward wall 12 located in an arc about hole 30 and shaft 28. Disk 26 includes a sector-shaped section 38 which acts as a detent spring and a projection on the end of sector-shaped section 38 which extends into recesses 36 and acts as a detent for predeterminedly locating the disk at a series of different positions. Recesses 36 and the projection on section 38 are so arranged with respect to one another and apertures 34 that one of the apertures 34 is aligned with aperture 20 when the projection is engaged in a recess. The disk also includes stops for limiting its rotary movement and, in the form shown, these stops comprise a radial projection 42 on disk 26 which is adapted to engage a stud 44 when the disk is pivoted in a clockwise direction (viewing Figs. 2 and 3) and engage lower wall 16 when the disk is pivoted in the opposite direction.

The shutter includes a rotary blade 46 adapted to cover aperture 20 and the one of apertures 34 aligned therewith and to move so as to uncover the apertures to make an exposure of predetermined duration. Blade 46, unlike the previously mentioned shutter elements, is preferably fabricated from sheet metal and includes a cover portion 48 and a counterbalance portion 50. Blade 46 is mounted for rotary movement intermediate portions 48 and 50 and independently of disk 26 on a metal stud 52 secured to the center of diaphragm disk 26.

Cover portion 48 of blade 46 is normally located in aperture-covering position (shown in Fig. 2) wherein it extends across aperture 20 and is pivotable from this position in a counterclockwise direction to uncover the aperture and permit light to pass therethrough. In the type of shutter with which the present invention is concerned, an initial force or push is imparted to the shutter blade to commence the aperture-uncovering movement and the remaining motion of the blade, including return movement to aperture-covering position, is substantially free and hence subject to fairly accurate control. To return the blade to its aperture-covering position, a rebound member or spring is provided in the path of counterclockwise rotation of a portion of the blade. This rebound member reverses the direction of movement of the blade without substantial inertia loss and returns it to aperture-covering position. The length or duration of exposure, that is, the time during which the aperture is uncovered, is a function of the angle of rotation of the blade which, in turn, is controlled by the position of the rebound member. In this way the duration of exposure or "speed" of the shutter can be controlled very accurately by varying the position of the rebound member.

The size of the aperture and the duration of exposure both can be controlled or set by a single element by coupling the rebound member with diaphragm 26 so that rotation of the disk is also effective to alter the position of the rebound member. In the shutter shown the rebound member comprises a radial arm 54 which is formed as an integral part of disk 26. Arm 54 has a rearwardly extending stud 56 at its end adapted to engage a lug 58 on the end of cover portion 48 of blade 46 during counterclockwise rotation of the blade. Arm 54 is somewhat resilient and acts as a spring for reversing the direction of movement of the blade to return it to aperture-covering position. Thus, as disk 26 is rotated in a counterclockwise direction, the path of rotary movement of the blade is lengthened and the exposure duration is also increased. Rotation of the disk in a clockwise direction has the opposite effect, that is that of decreasing the duration of exposure or, in other words, increasing the shutter speed. The various speeds and aperture combinations are correlated with one another to give a range of predetermined exposures for which the shutter may be set. Suitable indicia may be provided on the outside of forward wall 12 designating the various positions to which lever 32 may be turned for selecting a particular aperture and speed combination for the shutter.

The shutter includes means for imparting an aperture-uncovering rotation to blade 46 and, in the form shown, this means comprises an elongated spring 60 having a substantially straight kicker section 62. Spring 60 is mounted so that kicker section 62 is free to function as a cantilever spring. The free end of kicker section 62 is located in the path of movement of lug 58 on blade 46 and is normally located adjacent the lug when the blade is in aperture-covering position. Kicker section 62 is adapted to be deflected, from the position shown in Fig. 2, downward in a counterclockwise direction to the position shown in Fig. 3, and then released so that the free end of section 62 engages lug 58 as the section springs upward, imparting a counterclockwise rotation to blade 46. Means are provided for limiting the movement of kicker section 62 comprising a pair of rearwardly projecting walls 64 and 66, preferably molded as an integral part of forward wall 12 and extending side by side from adjacent one of end walls 18 toward the opposite end wall. Kicker section 62 is free to pivot or be deflected within the channel, designated 68, formed by and between projecting walls 64 and 66 and is preferably biased upward against wall 64 so that it will impart a strong force or kick to the blade when the section is released after being deflected downward.

Spring 60 includes a second section 70 which extends downward toward lower side wall 16 between end wall 18 and a projecting wall 72 located adjacent end wall 18, and a third spring section 74 which extends generally parallel with lower side wall 16 and then upward at an angle and ends in a U-shaped end section 76 which is free to be deflected, and functions as a cantilever spring. The chassis of the shutter, including projecting walls 64, 66 and 72, is preferably formed of a heat-fusible plastic material so that the shutter elements can be assembled and secured together by softening portions of the plastic material by the application of heat, so that said portions can be deformed and employed to retain the various elements together or so that the material comprising the chassis itself acts as an adhesive. To mount and retain spring 60 in place, portions of projecting walls 64, 66 and 72 and designated 78 are heated, deformed and fused together across channel 68 so as to firmly engage and retain kicker section 62 of the spring when fused portions 78 are allowed to cool and harden. A portion 79 of side wall 16 is also heated and fused so as to retain section 74 of spring 60. Second section 70 of the spring is curved in the section which extends between projecting wall 72 and end wall 18 so that it is engaged by both said walls which aid in retaining the spring in its proper position.

The return rotary movement of blade 46 to aperture-covering position is arrested when lug 58 strikes the free end of kicker section 62. Means are provided for preventing the blade from rebounding or bouncing from aperture-covering position as the lug strikes the end of kicker section 62. This means comprises a cantilever spring 80 mounted at its upper end adjacent upper side wall 14 and extending downward toward lower side wall 16. The upper end of cantilever spring 80 is generally T-shaped and is secured within a recess formed by suitably shaped projecting wall sections 82 which are deformed and fused behind the spring to retain it in the recess provided, so that its free end is free to pivot toward and away from forward wall 12. Spring 80 extends toward lower side wall 16 across and behind the free end of kicker section 62 and includes a first portion 84, located above kicker section 62, bent or inclined slightly toward forward wall 12, a reentrant portion 86 extending away from forward wall 12 and an end portion 88 located to the rear and below kicker section 62 and bent or inclined sharply toward forward wall 12.

Spring 80 is so positioned that lug 58 on blade 46 moves between the spring and forward wall 12 and, during return movement of the blade to aperture-covering position, lug 58 frictionally engages first portion 84, slowing down the blade rotation and bringing it to a gradual halt. The blade may still have sufficient kinetic energy to rebound from kicker section 62 of spring 60 upon striking the spring. However, this energy is absorbed by frictional contact with spring 80 so that the blade does not rotate from aperture-covering position. When kicker section 62 of spring 60 is deflected downward for making an exposure, the free end thereof engages end portion 88 of spring 80, pivoting the latter away from forward wall 12 and out of engagement with lug 58, so that the blade is free to rotate under the push or impact imparted by kicker section 62 when it is released and springs upward. Kicker section 62 springs upward very rapidly, preferably at such a rate that the lug is rotated from a position where it may be engaged by spring 80 before the spring has returned to its original position and in this way the lug is not engaged by spring 80 during aperture-uncovering movement of the blade. To prevent blade 46 from pivoting from aperture-covering position during deflection of kicker section 62 of spring 60 and for retaining the lug against the end of the kicker section, there is provided a hair spring 90 secured at one end to a stud 92, formed on forward wall 12 and at its other end to a tab 94 turned up from cover portion 48 of blade 46 and adapted to urge the clockwise rotation of the blade. Hair spring 90 is comparatively weak so that the torsional force imparted thereby to the blade does not materially affect the free rotational characteristics of the blade but merely tends to hold the blade in aperture-covering position. Another stud, designated 96, is provided adjacent the end of spring 80 as a limit stop for clockwise rotation of blade 46 during downward deflection of kicker section 62 of spring 60 whereby a gap is provided between the kicker section and lug 58 when the kicker section is fully deflected and released. By virtue of this arrangement, the kicker section is already in motion when it engages and imparts a push to the lug on the blade. Stud 96 may also limit the upward movement of U-shaped end section 76 of spring 60.

The shutter includes actuating means for depressing or deflecting kicker section 62 of spring 60 downward and then releasing the kicker section for upward movement so as to impart an aperture-uncovering rotation to blade 46. This actuating means comprises an elongated push rod 100 mounted for sliding movement in the direction of its elongation and generally perpendicular to kicker section 62. An outer end section 102 of push rod 100 is slightly narrower than the remainder of the rod and projects through a slot 104 in upper side wall 14 exterior of the shutter where it may be engaged for depressing rod 100 and actuating the shutter. The rod includes an engagement portion, designated 106, intermediate its ends which extends through guide openings 105 and 107 in, respectively, projecting walls 64 and 66, and across and to the rear of kicker section 62. Engagement portion 106 includes a recessed or reentrant section through which kicker section 62 extends, this reentrant section including an upper shoulder 108 adapted to engage the rearmost edge of kicker section 62 for deflecting the latter downward when rod 100 is moved downward toward lower side wall 16. Kicker section 62 includes a reentrant section 110 partially underlying and extending to the left (viewing FIGS. 2 and 3) of engagement portion 106. A rearwardly projecting wall 112 is provided, extending downward and inclined to the left, adapted to coact with the end of push rod 100 as the latter is depressed for deflecting the rod to the left. Thus as the push rod is moved downward in engagement with kicker section 62 so as to deflect the latter, its lower end section, designated 114, is moved to the left by coaction with wall 112 until shoulder 108 is moved into reentrant section 110 and is disengaged from kicker section 62, releasing the latter so that it may spring upward, imparting an aperture-uncovering movement to the shutter blade.

To insure the proper movement of rod 100, release of spring kicker section 62 at the proper position and return motion of the push rod, lower end portion 114 is provided with a recess 116 in which is engaged the end of U-shaped section 76 of spring 60. This section of spring 60 urges the end of push rod 100 against wall 112 and in an upward direction so as to cause return movement of the push rod after it has been depressed. The side of engagement portion 106 of push rod 100 is provided with a recess 118 located above shoulder 108 so that the engagement portion will not interfere with the upward spring movement of kicker section 62 when the latter is released. The shutter is intended to be actuated manually by depressing push rod 100. It is important that the rod be pushed substantially in the direction of its elongation and not to one side, since otherwise kicker section 62 may be released prematurely. Accordingly, it is desirable that provision be made so that push rod 100 can be depressed in only the proper manner and is not directly contacted by the operator. For this reason, there is provided a lever or arm 120 molded integrally with upper side wall 14 and extending as a cantilever generally parallel with, and spaced from, upper side wall 14 across slot 104 through which end section 102 of push rod 100 projects. It is intended that the operator manually engage and depress arm 120 which, in turn, depresses rod 100 and can do so in only one direction, thereby precluding the possibility of a sidewise force or moment being exerted on the end of the push rod and interfering with the proper function of the shutter.

The shutter includes means for preventing the admission of light through the shutter into photographic apparatus with which the shutter is associated. This means comprises a rearwardly projecting wall 122 extending from wall sections 82 to wall 64 and a light baffle or projection 124 on push rod 100 which extends toward wall 122. A rear wall 126, preferably formed of an inexpensive sheet material such as cardboard, is provided for enclosing the shutter elements as well as for preventing light leaks. Rear wall 126 includes an exposure aperture 128 located in alignment with aperture 20 and is seated at its edges between inner lips 14a, 16a and 18a on shoulders formed by upper side wall 14, lower side wall 16 and end walls 18. Rear wall 126 is also seated on the rear portions of walls 64 and 122 and wall sections 82 whereby any light entering through slot 104 is prevented from reaching exposure aperture 128 in rear wall 126. Projection 124 on push rod 100 prevents light entering slot 104 from passing through guide opening 105 in wall 64 into the portion of the shutter wherein such light might enter aperture 128. Rear wall 126 is secured in place by such means as studs 130 provided on bosses 132 on forward wall 12 and on wall 66 and adapted to extend through corresponding holes in the rear wall. The portions of studs 130 which extend through rear wall 126 are softened by heat and flattened to form heads which secure the rear wall in place.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera shutter comprising a housing member having an exposure aperture and a shutter blade mounted for rotation and normally located in a position covering said exposure aperture, the combination of a diaphragm disk mounted coaxially with said shutter blade for rotation independently of said shutter blade, said disk including a portion having a plurality of diaphragm apertures spaced arcuately around its axis of rotation in position to become aligned with said exposure aperture and indexing means for rotating said diaphragm disk to any one of a plurality of predetermined positions wherein one of said diaphragm apertures is in alignment with said exposure aperture, means for releasably retaining said shutter blade in aperture-covering position, a cantilever spring for imparting an aperture-uncovering rotary movement to said shutter blade, said cantilever spring having a free end section located in the path of rotary movement of at least a portion of said shutter blade, a manually operable actuating element releasably engageable with said spring for predeterminedly deflecting and biasing said spring in one direction and for then releasing said spring to move in the opposite direction and deliver an impact to said shutter blade, said diaphragm disk including as an integral part thereof an elastic rebound member located in the path of rotary movement of said blade at a point arcuately spaced along said path from the aperture-covering position of said blade for reversing the direction of rotation of said blade and returning said blade to aperture-covering position, the position of said rebound member comprising said diaphragm disk being adjustable by rotation of said diaphragm disk for varying the total angle of rotation of said blade and consequently the time during which said aperture is uncovered by said blade.

2. A shutter as defined in claim 1 wherein said diaphragm disk, including said rebound member, is formed as a unit of molded plastic material.

3. The shutter of claim 1 wherein said indexing means includes a manually engageable member coupled with said diaphragm disk and located exterior of the shutter housing, a plurality of recesses in a wall of said housing adjacent said disk arranged arcuately around the axis of rotation of said diaphragm disk, said disk including as an integral part thereof a radially extending resilient detent section having at least a portion adapted to be engaged in one of said recesses at each of said predetermined positions of said disk.

4. The shutter of claim 1 wherein said cantilever spring comprises an end section of a first spring having another end section coupled with said actuating element for returning it to its original position following deflection and release of said cantilever spring.

5. A photographic shutter as defined in claim 1 wherein said means for retaining said shutter blade in aperture-covering position comprises a second cantilever spring having a portion extending at an angle into the path of rotary movement of at least a portion of said shutter blade for frictionally engaging said shutter blade during movement of the latter into aperture-covering position and retaining said blade in said position.

6. A shutter as defined in claim 5 wherein the first mentioned cantilever spring and a section of said second cantilever spring are so positioned with respect to one another as to coact with one another when said first canilever spring is deflected for deflecting said second cantilever spring from engagement with said shutter blade.

7. A camera shutter comprising a housing member for supporting the elements of said shutter and including an exposure aperture in said housing member and means for mounting a lens in alignment with said exposure aperture, a diaphragm disk including a section having a plurality of diaphragm apertures therein, said disk including means for mounting it for rotation on said housing member so that said diaphragm apertures are movable into alignment with said exposure aperture, means for rotating said diaphragm disk so as to move any of said diaphragm apertures into alignment with said exposure aperture, said housing member including a plurality of engagement sections arranged arcuately around the axis of said diaphragm disk, said diaphragm disk including as an integral part thereof a resilient detent arm for engaging said engagement sections to locate said disk at each of a plurality of predetermined positions wherein one of said diaphragm apertures is located in alignment with said exposure aperture, a shutter blade, means mounting said shutter blade for rotary movement coaxially with, and independently of, said diaphragm disk, said shutter blade being normally located in a position covering said aperture and being pivotable to a position wherein said exposure aperture is uncovered, first spring means for releasably engaging and retaining said shutter blade in aperture-covering position, means for applying an impact to said shutter blade to impart a rotary movement to said blade, the last-mentioned means including a second spring having an end section located in the path of rotary movement of at least a portion of said blade and a manually operable actuating element in releasable engagement with said second spring for deflecting said end section of said second spring and releasing the deflected spring so as to deliver an impact to said blade, and means for reversing the direction of rotation of said blade to return said blade to aperture-covering position, said reversing means including an elastic rebound member comprising a portion integral with said diaphragm disk located in the path of rotary movement of said blade at a point arcuately spaced from the aperture-covering position of said blade, said disk, said rebound member and said detent arm comprising a single integral unit, the position of said rebound member being alterable by rotation of said diaphragm disk for varying the total angle of rotation of said blade and consequently the time during which said aperture is uncovered by said blade.

8. The shutter of claim 7 wherein said housing member, said single integral unit and said actuating element for deflecting said second spring are formed of molded plastic material.

9. The shutter of claim 7 wherein said housing member includes a generally flat wall on which the elements of the shutter are supported, said engagement sections comprise a plurality of recesses in the surface of said wall, said diaphragm disk is substantially flat and is mounted closely adjacent said surface of said wall, and said detent arm comprises a resilient sector-shaped section of said diaphragm disk having a detent portion which projects into said recesses.

10. The shutter of claim 7 wherein said second spring includes an elongated section mounted at one end in the form of a cantilever with its other end located in the path of rotary movement of said shutter blade in position to engage said blade, and said first spring means extends generally perpendicular to said elongated section and includes a first portion located in the path of movement of said shutter blade for engaging and retaining the same, and a second portion so positioned as to be engaged by said other end of said elongated section of said second spring as the latter is deflected and coact with said other end for deflecting said first spring means and disengaging the latter from said shutter blade.

11. In the shutter of claim 10, a relatively weak hair spring coupled with said blade and said housing member for urging said blade into aperture-covering position.

12. A camera shutter comprising a housing member including a forward wall for supporting the elements of said shutter and including an exposure aperture in said wall and means on said wall for mounting a photographic objective lens in alignment with said exposure aperture, a generally circular diaphragm disk including a first sector-shaped section having a plurality of diaphragm apertures therein, said disk including a stud at its center for mounting said disk for rotation on said wall with said first sector-shaped section extending across said exposure aperture so that said diaphragm apertures are movable into alignment with said exposure aperture, means associated with said stud and mounted on the outside of said forward wall for rotating said diaphragm disk so as to move any of said diaphragm apertures into alignment with said exposure aperture, said disk being generally flat and located closely adjacent the surface of said wall and including as an integral part thereof a resilient second sector-shaped section having a projecting portion, said wall including a plurality of engageable portions arranged in an arc about the axis of rotation of said disk for engaging said projecting portion of said second sector-shaped section and releasably retaining said disk at any of a plurality of predetermined positions wherein one of said diaphragm apertures is located in alignment with said exposure aperture, a shutter blade, means mounting said shutter blade for rotary movement coaxially with, and independently of, said diaphragm disk, first spring means normally engaging and retaining said shutter blade in a position covering said aperture, said shutter blade being pivotable from said aperture-covering position for uncovering said aperture, said first spring means being generally elongated and mounted at one end so that it extends generally tangent to the path of movement of at least a portion of said blade when said blade is in aperture-covering position, said first spring means including an intermediate section projecting into the path of movement of said portion of said blade so as to engage and retain said blade in aperture-covering position, means for applying a sharp impact to said shutter blade to impart a rotary movement to said blade for uncovering said aperture, the last-named means including a second spring having an elongated and relatively straight end section comprising a cantilever spring extending generally at a right angle with respect to said first spring into the path of movement of said portion of said shutter blade, and a manually operable actuating element releasably engageable with said cantilever spring for deflecting said end section comprising said cantilever spring in a direction opposite the direction of movement to be imparted to said blade and for releasing said cantilever spring at a predetermined position so that it will deliver an impact to said blade, said first spring means including an end section extending at an angle into the path of movement of said cantilever spring for coacting with said cantilever spring as the latter is deflected, for deflecting said first spring and disengaging said first spring from said blade, a third spring means coupled with said blade for urging said blade into aperture-covering position and toward said cantilever spring when the latter is deflected, and means for reversing the direction of rotation of said shutter blade to return said blade to aperture-covering position, said reversing means including an elastic rebound member comprising a portion of said diaphragm disk located in the path of rotary movement of said blade at a point arcuately spaced from the aperture-covering position of said blade, the position of said rebound member being alterable by rotation of said diaphragm disk for varying the total angle of rotation of said blade and consequently the time during which said aperture is uncovered by said blade.

13. The shutter of claim 12 wherein said housing member, said diaphragm disk and said actuating element for deflecting said cantilever spring are formed of molded plastic material.

14. The shutter of claim 13 wherein only said shutter blade and said springs are formed of metal.

15. The shutter of claim 12 wherein said first spring means includes a first portion extending generally parallel with said forward wall, a second portion inclined toward said wall and extending behind said portion of said blade so as to engage said blade when the latter is in aperture-covering position, a reentrant portion extending behind said cantilever spring, and a free end portion inclined toward said forward wall and adapted to be engaged by said cantilever spring when the latter is deflected for deflecting said first spring away from said wall and from engagement with said shutter blade.

16. The shutter of claim 12 wherein said third spring is a relatively weak torsional hair spring secured at one end to said blade and at its other end to said forward wall.

17. The shutter of claim 12 wherein said actuating element comprises an elongated member mounted for movement in the direction of its elongation generally perpendicular to the direction of elongation of said cantilever spring, said member having a section extending exterior of the shutter housing through an opening therein whereby said elongated member may be engaged and depressed, and an intermediate section including an engagement portion extending behind said cantilever spring for engaging said cantilever spring and deflecting the latter when said elongated member is depressed, said forward wall of said housing member including means for guiding said elongated member and projecting means located in the path of sliding movement of said elongated member for engaging and coacting with the other end of said elongated member as it is depressed to impart a sidewise motion thereto, causing said engagement portion of said elongated member to be disengaged from said cantilever spring at a predetermined point.

18. The shutter of claim 17 wherein said second spring includes another end section comprising a second cantilever spring engaged with said other end section of said elongated member for urging said member to return to its position prior to being depressed.

19. The shutter of claim 17 wherein said housing member includes a deformable member projecting therefrom and having a portion extending transversely of the direction of sliding movement of said elongated member and in engagement with said one end of said elongated member.

20. In a camera shutter comprising a housing member having an exposure aperture and a shutter blade mounted for rotation and normally located in a position covering said exposure aperture, the combination of a resilient means frictionally engageable with said blade for releasably retaining said blade in aperture-covering position, a cantilever spring having a free end located in the path of rotary movement of at least a portion of said shutter blade, a manually operable actuating element engageable with said spring for predeterminedly deflecting and biasing said spring in one direction and for then releasing said spring to move in the opposite direction and deliver an impact to said blade, said cantilever spring being so disposed as to engage and deflect said resilient means for disengaging the latter from said shutter blade when said spring is deflected in said one direction, and thereby freeing said blade for movement responsively to said impact, and rebound means located in the path of rotary movement of said blade at a point arcuately spaced from said aperture-covering position for reversing the direction of rotation of said blade and returning said blade to aperture-covering position.

References Cited in the file of this patent

UNITED STATES PATENTS

| | | |
|---|---|---|
| 1,689,268 | Wittel | Oct. 30, 1928 |
| 1,787,797 | Riddell | Jan. 6, 1931 |
| 2,356,880 | Pignone | Aug. 29, 1944 |
| 2,531,936 | Fairbank et al. | Nov. 28, 1950 |
| 2,537,110 | Wilkinson | Jan. 9, 1951 |
| 2,584,912 | Palmer | Feb. 5, 1952 |
| 2,662,457 | Fairbank | Dec. 15, 1953 |